Aug. 23, 1955　　　F. C. RANKIN ET AL　　　2,715,941
SHEET MATERIAL SLAB CUTTER

Filed June 27, 1952　　　　　　　　　　4 Sheets-Sheet 1

INVENTORS.
Floyd C. Rankin,
Oral H. Good,
BY Victor J. Evans & Co.
ATTORNEYS

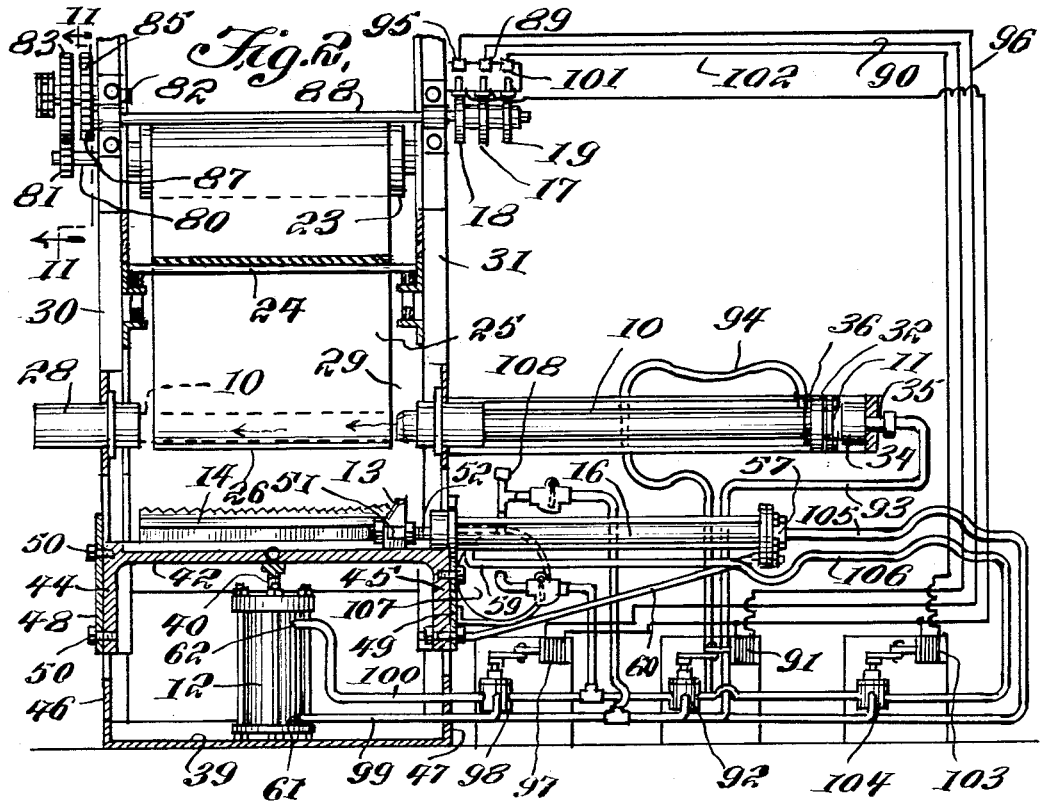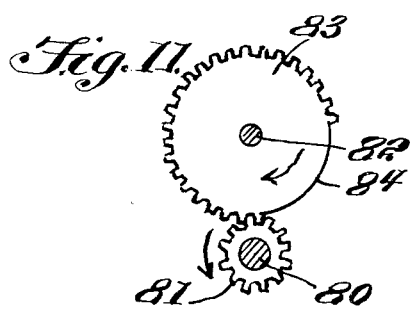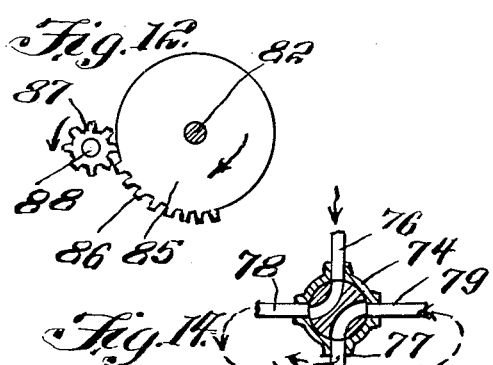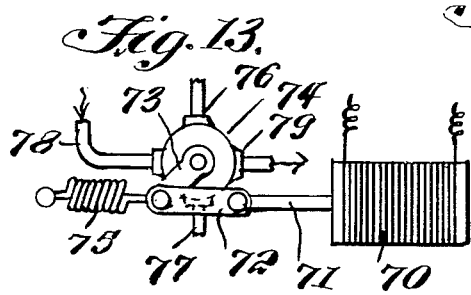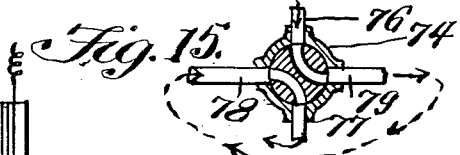

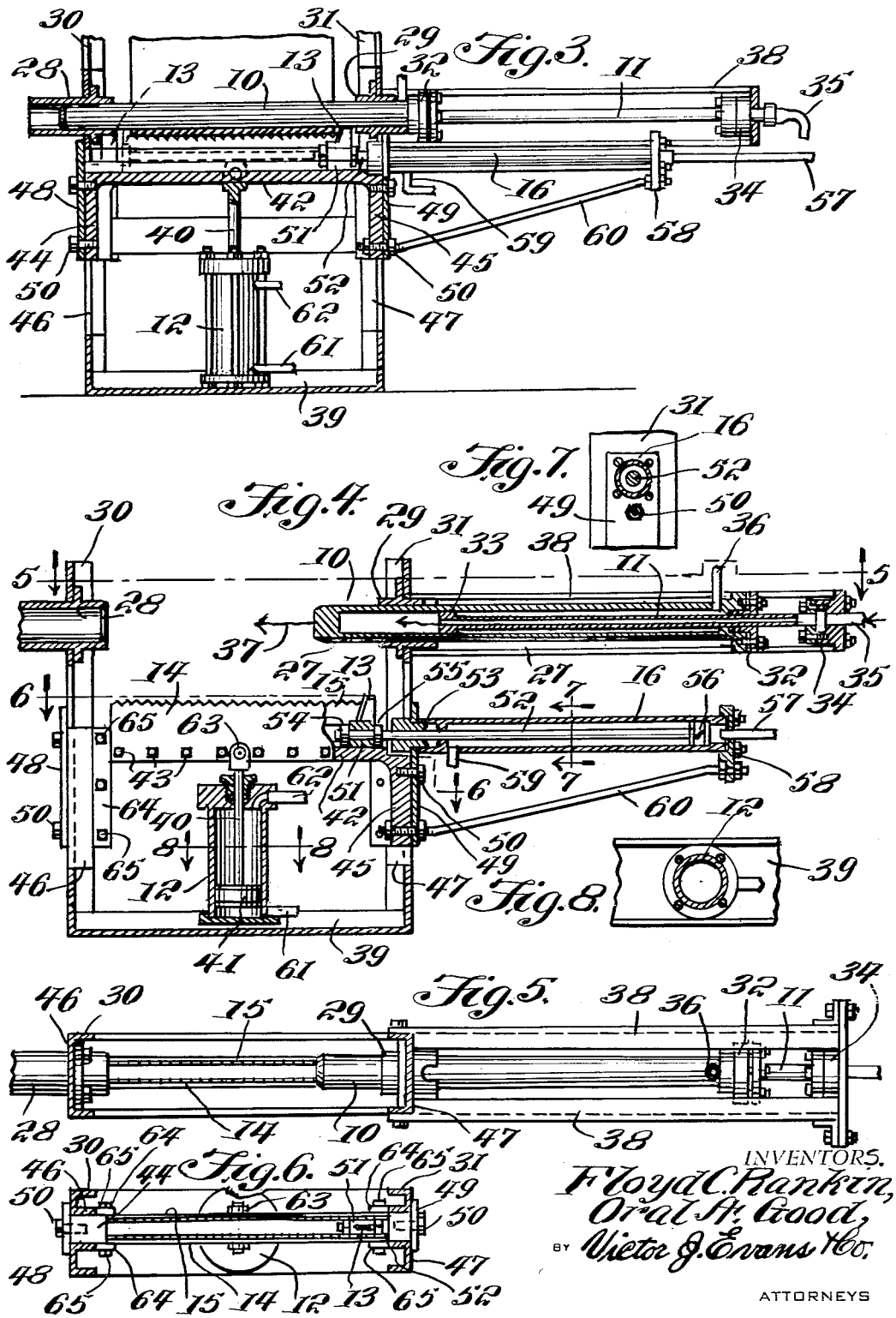

Aug. 23, 1955   F. C. RANKIN ET AL   2,715,941
SHEET MATERIAL SLAB CUTTER
Filed June 27, 1952   4 Sheets-Sheet 4
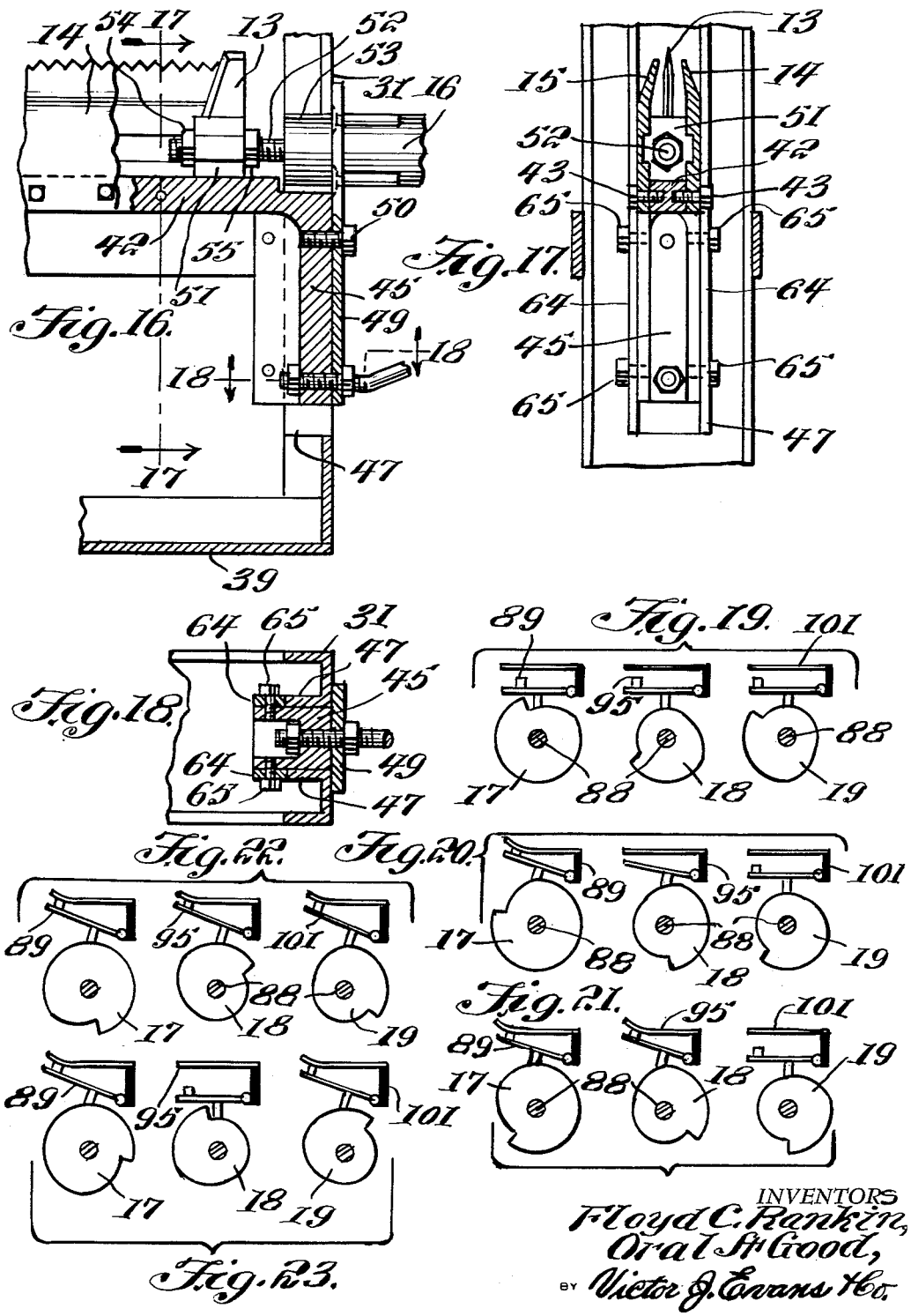

United States Patent Office 2,715,941
Patented Aug. 23, 1955

2,715,941

SHEET MATERIAL SLAB CUTTER

Floyd C. Rankin and Oral A. Good, Indiana, Pa., assignors to The McCreary Foundation, Inc., Indiana, Pa.

Application June 27, 1952, Serial No. 295,914

9 Claims. (Cl. 164—73)

This invention relates to a machine for cutting continuous sheets of material, such as rubber into strips or slabs with the end of the sheet carried around a cylinder having a longitudinally disposed groove therein and suspended over a bar or slat of a conveyor and wherein gripping elements hold the sheet on both sides of the groove of the cylinder as a cutting knife is driven longitudinally through the groove for separating the continuous sheet into slabs.

The purpose of this invention is to cut a continuous sheet of material, such as rubber, into short lengths or slabs automatically as the sheet passes from a sheet-off machine to a conveyor.

In the manufacture of motor vehicle tires continuous sheets of rubber are cut transversely into slabs of comparatively short length and because of the elastic material this operation, which is performed by hand, is difficult and it is also difficult to obtain a smooth clean cut. With this thought in mind this invention contemplates a device for mechanically cutting continuous sheets of rubber transversely with the sheet gripped on both sides of a slot or groove and with a knife driven by a pneumatic cylinder along the groove and through the sheet of material.

The object of this invention is, therefore, to provide means for actuating a knife for cutting a continuous sheet of rubber between spaced gripping jaws and wherein the rubber is cut with smooth even edges.

Another object of the invention is to provide an attachment for a sheet-off machine for cutting sheets of rubber into short lengths or slabs in which the attachment is adapted to be mounted on a machine without materially changing the design or structure of the machine.

A further object of the invention is to provide a sheet rubber cutting attachment for sheet-off machines in which the attachment is of a simple and economical construction.

With these and other objects and advantages in view the invention embodies a transversely movable cylinder having a knife groove in the lower edge with a pneumatic cylinder for withdrawing and replacing the grooved cylinder, a knife guide having gripping jaws for clamping a sheet of material on both sides of the slot of the transversely positioned cylinder, a knife slidably mounted in the knife guide and positioned to extend into the groove of the cylinder, a pneumatic cylinder for actuating the knife, a vertically positioned cylinder for elevating the guide with the knife therein and also the cylinder for actuating the knife and suitable cams and solenoid controls for supplying air under pressure to said cylinders.

Other features and advantages of the invention will appear from the following description taken in connection with the drawings, wherein:

Figure 2 is a cross section through the machine shown in Fig. 1 showing the actuating cylinders and control elements therefor extended from one side of the machine.

Figure 3 is a cross section similar to that shown in Fig. 2 illustrating the first step in the operation of the attachment wherein the cylinder with the knife groove therein is driven into operative position across the machine.

Figure 4 is also a section similar to that shown in Figs. 2 and 3 with the operating cylinder shown in section and showing the cylinder having the knife groove therein partly withdrawn.

Figure 5 is a plan view taken on line 5—5 of Fig. 4 also showing the cylinder having the knife groove therein partly withdrawn.

Figure 6 is a sectional plan taken on line 6—6 of Fig. 4 illustrating the knife and guide in which the knife is mounted.

Figure 7 is a cross section taken on line 7—7 of Fig. 4 showing the knife actuating cylinder.

Figure 8 is a sectional plan taken on line 8—8 of Fig. 4 showing the cylinder for elevating the knife, guide, and knife actuating cylinder with the piston rod omitted.

Figure 11 is a detail showing a section taken on line 11—11 of Fig. 2 illustrating a segmental gear for actuating the feed roller.

Figure 12 is a section similar to that shown in Fig. 11 showing the cam operating segment.

Figure 13 is a detail illustrating one of the solenoids for operating one of the valves that supply fluid under pressure to the cylinders.

Figure 14 is a detail through the valve showing one position of passages therethrough.

Figure 15 is section similar to that shown in Fig. 14 showing the valve passages reversed.

Figure 16 is a detail showing a section through one side of the attachment, with the parts shown on an enlarged scale and illustrating the connection of the knife actuating cylinder to the knife.

Figure 17 is a cross section taken on line 17—17 of Fig. 16 also showing the knife actuating elements.

Figure 18 is a sectional plan taken on line 18—18 of Fig. 16 illustrating the track for elevating the knife and parts associated therewith.

Figure 1:
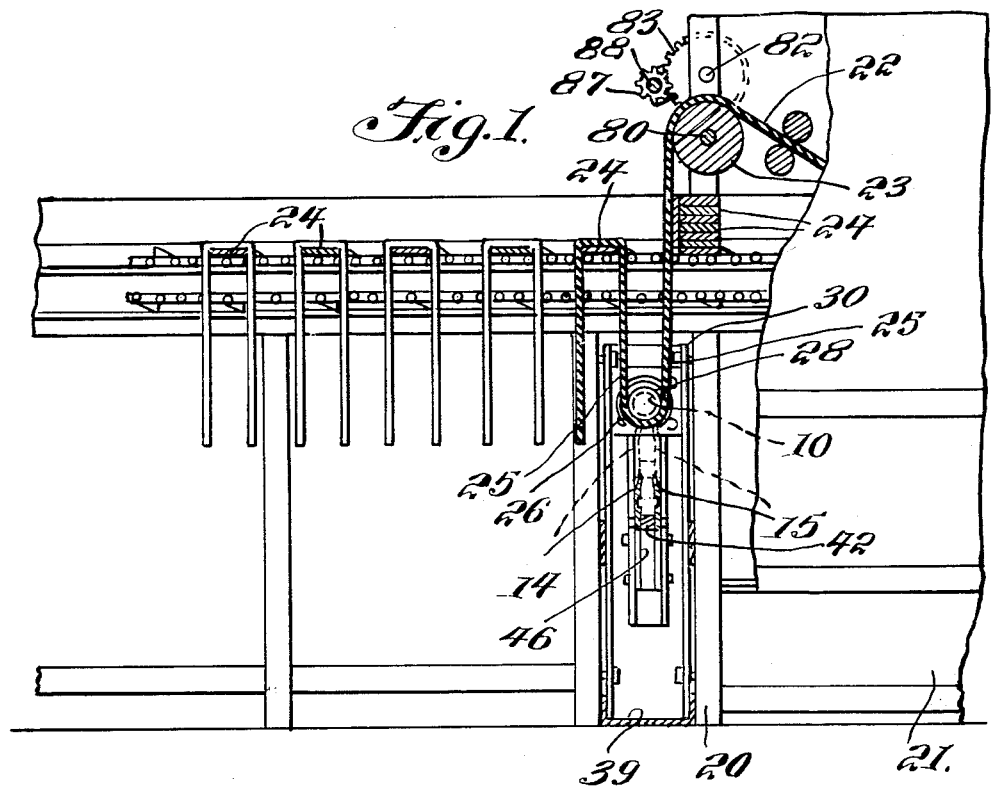
Figure 1 is a view showing a longitudinal section through the intermediate part of a sheet-off machine showing a sheet of rubber from the machine extended around the transversely positioned cylinder.
Figure 9:
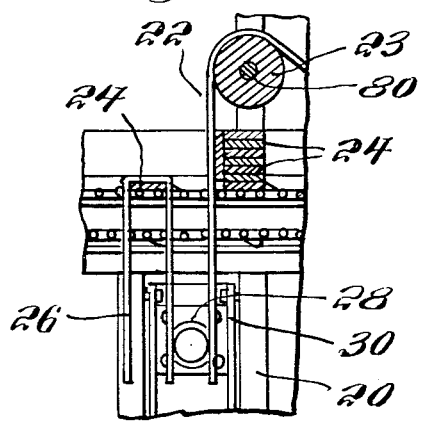
Figure 9 is a longitudinal section similar to that shown in Fig. 1 showing the extended end of the rubber sheet and slab after the cut has been completed.

Figures 19 to 23, inclusive, illustrate different positions of the operating cams.

Figure 19 shows the position of the cams with the parts at rest.

Figure 20 shows a circuit closed to the solenoid for actuating the cylinder that moves the cylinder with the knife groove therein across the attachment.

Figure 21 shows the air held on this cylinder and also applied to the cylinder for elevating the knife, guide, and the knife actuating cylinder.

Figure 22 shows the circuit completed to the elements for actuating the knife.

Figure 23 shows the positions of the cams for retracting the elements.

Referring now to the drawings wherein like reference characters denote corresponding parts the improved sheet material cutting attachment of this invention includes a cutting cylinder 10 having a tubular piston rod 11 extended from one end, a knife elevating cylinder 12, a knife 13 with gripping jaws 14 and 15 at the sides, a knife actuating cylinder 16, and a plurality of cams 17, 18 and 19.

This attachment is mounted on an intermediate wall 20 of a sheet-off or batch-off machine as indicated by the numeral 21 and the web or sheet of rubber, as indicated by the numeral 22 passes over a feed roller 23, as illustrated in Fig. 1, downwardly and around the cutting cylinder 10 and from the cutting cylinder over a slat or bar 24 from which the end 25 of the material hangs downwardly providing loop 26.

Figure 10:
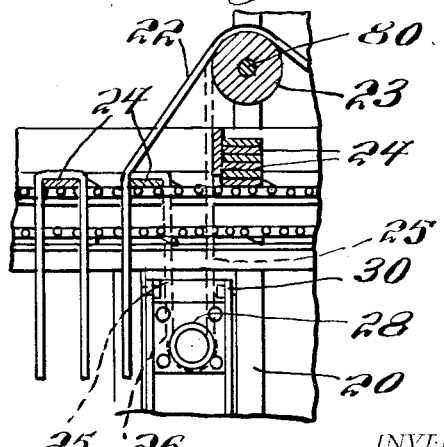
Figure 10 is also a section similar to that shown in Fig. 1 illustrating the method of positioning the loop forming the slab on one of the transversely disposed bars of the conveyor extended through the attachment.

After the web is cut a depending end is engaged by a slat of the conveyor and with continued movement of the conveyor the slat or bar carries the web outwardly, as shown in Fig. 10, and as the web is fed with the roller 23 it drops downwardly, as indicated by the dotted lines, wherein the cylinder 10 is projected through the web, as illustrated in Figs. 3 and 4. After the cylinder is in position the cylinder 12 elevates the knife assembly and as the gripping jaws engage the under surface of the material on the cylinder 10 the knife is driven across the web by fluid pressure in the cylinder 16. Upon continued movement of the cam the fluid pressure is reversed and the parts are retracted for the next cycle.

The cylinder 10 which is provided with a knife groove 27 is slidably mounted in sleeves 28 and 29 in side members 30 and 31, respectively of the frame of the machine and, as illustrated in Figs. 4 and 5 the opposite end of the cylinder is provided with a packing gland 32 through which the tubular stem or piston rod 11 extends. The inner end of the piston rod is provided with a piston 33 through which a passage extends and the outer end of the piston rod is connected by a coupling 34 to a tube 35 which extends to a means for supplying fluid under pressure. The cylinder 10 is also provided with a connection 36 through which fluid is supplied to the interior of the cylinder 10 for retracting the cylinder.

With the parts arranged in this manner fluid under pressure supplied to the piston rod 11 passes into the inner end of the cylinder 10 whereby the cylinder is driven in the direction of the arrow 37 until the extended end thereof passes into the sleeve 28. The cylinder 10 with the mounting elements therefor is supported in a suitable frame 38 which extends from the side of the frame of the machine.

The cylinder 12 is mounted on a base 39 of the machine and a piston rod 40 extended from a piston 41 therein is connected to a cross bar 42 on the sides of which the clamping jaws 14 and 15 are secured with bolts 43.

The bar 42 is provided with vertically disposed end sections 44 and 45, which are channel-shaped in cross section and which are slidably mounted in tracks 46 and 47 in the side frame members 30 and 31, as shown in Figs. 3 and 18. The ends 44 and 45 are secured in position with end plates 48 and 49, respectively and the plates are held with cap screws 50.

The knife 13 is mounted on a base 51 that is slidably mounted on the bar 42 and between the sides or jaws 14 and 15 and the base is connected to a connecting rod 52 which extends through a packing gland 53 and into the cylinder 16, with nuts 54 and 55, which are threaded on the connecting rod.

The connecting rod 52 extends from a piston 56 and, with the parts in the position shown in Fig. 4 fluid under pressure supplied through a connection 57 to the cylinder head 58, drives the piston 56 toward the opposite end of the cylinder whereby the knife 13 is driven across the frame with the tip of the knife traveling in the groove 27, of the cylinder 10. The knife is returned by supplying fluid under pressure to a connection 59 extended from the opposite end of the cylinder 16. The outer end of the cylinder 16 is supported with a brace 60, one end of which is secured to the cylinder head 58, and the other to the end 45 of the bar 42.

With the parts assembled in this manner pressure applied to the lower end of the cylinder 12 through a connection 61 drives the piston 41 with the piston rod 40 and bar 42 with the knife, jaws 14 and 15 and cylinder 16 upwardly until the jaws 14 and 15 engage the web or sheet of rubber on the under side of the cylinder 10 as indicated by the dotted lines shown in Fig. 1. The knife assembly may be lowered by gravity however, a connection 62 is provided at the upper end of the cylinder 12 for driving the piston 41 with the knife assembly downwardly. The upper end of a piston rod 40 extended from the piston 41 is provided with a clevis 63 with which the piston rod is connected to the bar 42.

The edges of the ends 44 and 45 of the bar 42 are provided with strips 64 that are secured to the ends 44 and 45 with bolts 65.

With the parts assembled in this manner pressure through the connection 35 at the outer end of the tubular piston rod 11 drives the cylinder 10 across the frame of the machine and into the sleeve 28, and with this cylinder in position pressure is applied to the lower end of the cylinder 12 through the connection 61 whereby the piston 41 is forced upwardly carrying the knife assembly and with the knife assembly in position pressure is applied by the connection 57 to the outer end of the cylinder 16 whereby the piston 56 drives the knife across the machine with the tip of the knife traveling in the knife slot 27 of the cylinder 10. By reversing the fluid connections the knife is retracted and dropped downwardly and the cylinder 10 is retracted whereby the parts are set for another cycle of operation.

It will be understood that any suitable means may be provided for supplying fluid under pressure to the cylinders and suitable means may also be provided for timing the operations of the machine.

In the design shown the fluid supply connections are provided with four way valves, as illustrated in Figs. 13, 14 and 15 and the valves are controlled with solenoids. As illustrated in Fig. 13 a solenoid 70 is provided with a core 71 that is connected by a link 72 to a lever 73 on a valve 74 and the valve is secured in the position shown in Fig. 13 with a spring 75. As illustrated in Figs. 14 and 15 the valve is provided with a supply connection 76, a return connection 77 and connections 78 and 79 to the cylinders. With the valve positioned as shown in Fig. 14 fluid under pressure is supplied to one end of a cylinder and returned from the opposite end and with the valve reversed as shown in Fig. 15 fluid under pressure is applied to the said opposite end and returned from the former end.

In the design shown, the feed roller 23 is mounted on a shaft 80 one end of which is provided with a pinion 81 by which the shaft is rotated from a driving shaft 82 with a gear segment 83. The gear segment 83 is provided with a blank section 84 whereby the feed roller remains stationary during the cutting operation. During this period of time the cams are actuated by a gear segment 85 mounted on the driving shaft 82 and positioned whereby teeth 86 thereof mesh with a pinion 87 on a cam shaft 88.

The shaft 88 extends across the machine and the cams 17, 18 and 19 are mounted thereon as illustrated in Fig. 19.

The cam 17 is positioned to close a switch 89 which is connected by a wire 90 to a solenoid 91 that actuates a valve 92, similar to the valve 74 and the valve 92 is connected to the connections 35 and 36 of the cylinder 10 with tubes 93 and 94, respectively. The cam 18 is positioned to close a switch 95 which is connected by a wire 96 to a solenoid 97 and the solenoid 97 is positioned to operate a valve 98 which is connected by tubes 99 and 100 to the connections 61 and 62, respectively of the cylinder 12; and the cam 19 is positioned to close a switch 101 that is connected by a wire 102 to a solenoid 103 which operates the valve 104 and the valve 104 is connected to the connections 57 and 59 of the cylinder 16 by tubes 105 and 106. The tubes of each of the valves are connected to a compressed air tank or reservoir, as indicated by the numeral 107 and the tank may be connected to an air compressor or other means of supplying air under pressure through a connection 108.

With the parts arranged in this manner the cams are positioned whereby fluid under pressure is first applied to the cylinder 10 to drive the cylinder across the frame to the position shown in dotted lines in Fig. 2 and with the cylinder 10 in position the following cam supplies fluid under pressure to the cylinder 12 which elevates the knife assembly to the positions wherein the jaws 14 and 15 grip the rubber sheet, holding the sheet on both sides of the slot 27. With the parts in this position the following cam supplies fluid under pressure to the cylinder 16 which drives the knife across the machine cutting the web or sheet of material.

Upon completion of the cycle the cams permit the switches to open whereby the springs 75 return the valves to the return position whereby fluid under pressure is applied to the opposite ends of the cylinders, retracting the knife, knife assembly and cutting cylinder.

This attachment is an attachment for a sheet-off or batch-off machine and does not include conventional parts of the machine such as the feed roller 23 and bars 24 of the conveyor.

It will be understood that modifications, within the scope of the appended claims, may be made in the design and arrangement of the parts without departing from the spirit of the invention.

What is claimed is:

1. A sheet material cutter comprising means for suspending the sheet of material with parts of a depending section thereof in spaced relation and with the lower ends of the parts connected with an arcuate section, a cutting cylinder having a continuous knife slot extended longitudinally through the peripheral surface, means for projecting the cutting cylinder having the slot therein longitudinally and between the parts of the depending section of the sheet material, a knife, a guide having spaced gripping jaws, means urging said gripping jaws against the sheet material on the cylinder with one of said jaws on each side of said slot, means actuating the knife longitudinally of said gripping jaws with the cutting edge of the knife extended through said sheet material and into the slot of the cylinder, and means for retracting the knife and gripping jaws.

2. A sheet material cutting attachment comprising means for suspending the sheet of material with parts of a depending section thereof in spaced relation and with the lower ends of the parts connected with an arcuate section, a frame in which the sheet material suspending means are mounted, a cutting cylinder having a continuous longitudinally disposed slot in the peripheral surface thereof, means extending said cutting cylinder transversely across said frame and between the parts of the depending section of the sheet material, a guide having spaced gripping jaws positioned to engage the surface of said cylinder, a knife positioned to travel between said jaws, means actuating the knife longitudinally of the gripping jaws, and means moving the gripping jaws with the knife and knife actuating means whereby the gripping jaws contact the surface of the cylinder, and so that the knife is positioned to travel between the jaws and in the slot of the cylinder, thereby cutting a section of material from the sheet material.

3. In a sheet material cutting attachment, the combination which comprises a supporting frame having side members, spaced parallel elements carried by the side members of the frame for suspending a depending section of the sheet material with spaced vertically disposed parts of the said parts joined at the lower end of the section with an arcuate section of the sheet material aligned sleeves mounted in the side members of the frame, a cylinder having a continuous longitudinally disposed slot in the peripheral surface thereof mounted in one of said sleeves and positioned to extend across the frame with the extended end thereof in the other sleeve, a tubular connecting rod extended into said slotted cylinder, a piston on the connecting rod and positioned in the slotted cylinder, means for supplying fluid under pressure through the tubular connecting rod and piston to said cylinder whereby the slotted cylinder is driven across the machine and into the sleeve in the opposite side member of the frame, said sleeves being positioned whereby the cylinder is projected between the parts of the depending section of the sheet material, a knife guide having spaced parallel gripping jaws slidably mounted in the side members of the frame, a knife positioned to travel longitudinally of the gripping jaws to cut the sheet material, a cylinder extended from the gripping jaws for actuating the knife, and a fluid pressure actuated cylinder mounted on the frame and positioned to elevate the gripping jaws, the knife, and knife actuating cylinder.

4. A sheet material cutter attachment comprising means for suspending the sheet of material with parts of a depending section thereof in spaced relation and with the lower ends of the parts connected with an arcuate section, a cylinder having a continuous longitudinally disposed knife receiving groove in the peripherial surface, means projecting said grooved cylinder longitudinally between the vertically disposed parts of the depending section of the sheet material, means gripping the sheet material on both sides of the slot, a knife positioned at one end of the cylinder, and means carrying the knife across the attachment with the knife extended into the slot of the cylinder whereby the web is cut with the knife.

5. An attachment for cutting strips of material from an elongated web comprising means suspending the web with parts thereof forming spaced vertically disposed sections joined at their lower ends, a cylinder having a continuous longitudinally disposed slot in the peripherial surface, means projecting the cylinder between vertically disposed sections of the web, spaced gripping jaws positioned below the web, means actuating the gripping jaws into gripping relation with the web with the jaws positioned on opposite sides of the slot of said cylinder, a knife, means carrying the knife between the jaws with the cutting end of the knife extended into the slot of the cylinder whereby the web is cut by the knife, and means wtihdrawing the cylinder.

6. An attachment for cutting sheet material into strips comprising means for supporting a portion of said sheet material providing spaced vertical sections of said sheet material joined at their lower ends, a cylinder having a continuous longitudinally disposed slot in the peripherial surface positioned at one end of the attachment, means slidably mounting the cylinder in the attachment, a fluid pressure actuated cylinder in which the cylinder with the slot therein is positioned, said pressure actuated cylinder positioned to project the cylinder with the slot therein between vertically disposed sections of the sheet of material, a pair of spaced gripping jaws, means slidably mounting the jaws in the attachment whereby the jaws are mounted for vertical travel in said attachment, a fluid pressure actuated cylinder for elevating said jaws into gripping relation with the portion of said sheet material between the sections of which the cylinder with the slot therein is extended, a knife mounted to travel with said gripping jaws, and a fluid pressure actuated cylinder also mounted to travel with said gripping jaws positioned to drive the knife across the attachment between the gripping jaws and with the end of the knife extended into the slot of the cylinder in which the slot is positioned whereby sheet material extended around said cylinder is cut.

7. An attachment for cutting sheet material into strips comprising means for supporting a portion of said sheet material providing spaced vertical sections of said sheet material joined at their lower ends, a cylinder having a continuous longitudinally disposed slot in the peripherial surface positioned at one end of the attachment, means slidably mounting the cylinder in the attachment, a fluid pressure actuated cylinder in which the cylinder with the slot therein is positioned, said pressure actuated cylinder positioned to project the cylinder with the slot therein between vertically disposed sections of the sheet of material, a pair of spaced gripping jaws, means slidably mounting the jaws in the attachment whereby the jaws are mounted for vertical travel in said attachment, a fluid pressure actuated cylinder for elevating said jaws into gripping relation with the portion of said sheet material between the sections of which the cylinder with the slot therein is extended, a knife mounted to travel with said gripping jaws, and a fluid pressure actuated cylinder also mounted to travel with said gripping jaws positioned to drive the knife across the attachment between the gripping jaws and with the end of the knife extended into the slot of the cylinder in which the slot is positioned whereby sheet material extended around said cylinder is cut, said operating means of the cylinder having the slot therein, gripping jaws and knife adapted to retract said elements.

8. An attachment for cutting sheet material into strips comprising means for supporting a portion of said sheet material providing spaced vertical sections of said sheet material joined at their lower ends, a cylinder having a continuous longitudinally disposed slot in the peripheral surface positioned at one end of the attachment, means slidably mounting the cylinder in the attachment, a fluid pressure actuated cylinder in which the cylinder with the slot therein is positioned, said pressure actuated cylinder positioned to project the cylinder with the slot therein between vertically disposed sections of the sheet of material, a pair of spaced gripping jaws, means slidably mounting the jaws in the attachment whereby the jaws are mounted for vertical travel in said attachment, a fluid pressure actuated cylinder for elevating said jaws into gripping relation with the portion of said sheet material between the sections of which the cylinder with the slot therein is extended, a knife mounted to travel with said gripping jaws, a fluid pressure actuated cylinder also mounted to travel with said gripping jaws positioned to drive the knife across the attachment between the gripping jaws and with the end of the knife extended into the slot of the cylinder in which the slot is positioned whereby sheet material extended around said cylinder is cut, said operating means of the cylinder having the slot therein, gripping jaws and knife adapted to retract said elements, and valves for selectively applying fluid under pressure to said cylinders.

9. An attachment for cutting sheet material into strips comprising means for supporting a portion of said sheet material providing spaced vertical sections of said sheet material joined at their lower ends, a cylinder having a continuous longitudinally disposed slot in the peripheral surface position at one end of the attachment, means slidably mounting the cylinder in the attachment, a fluid pressure actuated cylinder in which the cylinder with the slot therein is positioned, said pressure actuated cylinder positioned to project the cylinder with the slot therein between vertically disposed sections of the sheet of material, a pair of spaced gripping jaws, means slidably mounting the jaws in the attachment whereby the jaws are mounted for vertical travel in said attachment, a fluid pressure actuated cylinder for elevating said jaws into gripping relation with the portion of said sheet material between the sections of which the cylinder with the slot therein is extended, a knife mounted to travel with said gripping jaws, a fluid pressure actuated cylinder also mounted to travel with said gripping jaws positioned to drive the knife across the attachment between the gripping jaws and with the end of the knife extended into the slot of the cylinder in which the slot is positioned whereby sheet material extended around said cylinder is cut, said operating means of the cylinder having the slot therein, gripping jaws and knife adapted to retract said elements, solenoid actuated valves positioned to control the flow of fluid under pressure to said cylinders, and a plurality of switches actuated by a moving part of a machine upon which said attachment is positioned for selectively completing the circuits to the solenoids of the valves for actuating the valves.

References Cited in the file of this patent

UNITED STATES PATENTS

| | | |
|---|---|---|
| 1,555,391 | Surfus | Sept. 29, 1925 |
| 1,619,079 | Leguillon | Mar. 1, 1927 |